US011503763B2

(12) United States Patent
Holman et al.

(10) Patent No.: US 11,503,763 B2
(45) Date of Patent: Nov. 22, 2022

(54) TRIMMER HEAD ASSEMBLY FOR A TRIMMER

(71) Applicant: TECHTRONIC CORDLESS GP, Anderson, SC (US)

(72) Inventors: Christopher A. Holman, Clemson, SC (US); Ronald J. Hoffman, Iva, SC (US); J. Eric Nolin, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 266 days.

(21) Appl. No.: 16/732,895

(22) Filed: Jan. 2, 2020

(65) Prior Publication Data

US 2020/0214202 A1 Jul. 9, 2020

Related U.S. Application Data

(60) Provisional application No. 62/704,044, filed on Jan. 3, 2019.

(51) Int. Cl.
*A01D 34/73* (2006.01)
*A01D 34/416* (2006.01)

(52) U.S. Cl.
CPC ....... *A01D 34/733* (2013.01); *A01D 34/4165* (2013.01); *A01D 34/736* (2013.01)

(58) Field of Classification Search
None
See application file for complete search history.

(56) References Cited

U.S. PATENT DOCUMENTS

| 3,826,068 | A | * | 7/1974 | Ballas | A01D 34/416 56/295 |
| 4,124,938 | A | * | 11/1978 | Ballas, Sr. | A01D 34/4165 30/276 |
| 4,177,561 | A | * | 12/1979 | Ballas | A01D 34/4165 30/276 |
| 6,594,907 | B2 | | 7/2003 | Wilson | |

(Continued)

FOREIGN PATENT DOCUMENTS

| CN | 206165186 U | 5/2017 |
| CN | 104938135 B | 6/2017 |

(Continued)

OTHER PUBLICATIONS

Techtronic Cordless GP; EP Patent Application No. 20150054; European Search Report; dated Apr. 29, 2020; (2 pages).

*Primary Examiner* — Hwei-Siu C Payer
(74) *Attorney, Agent, or Firm* — Dority & Manning, P.A.

(57) ABSTRACT

Trimmer heads for trimmers are provided. A trimmer head includes a drive plate defining a lug slot, and a locking lug, the locking lug movably positioned in the lug slot and movable between an unlocked position and a locked position. A trimmer head further includes a drive plate cover connectable to the drive plate such that the locking lug is disposed between the drive plate and the drive plate cover. A trimmer head farther includes at least one operational head, the at least one operational head connectable to the drive plate. The connected operational head is locked to the drive plate when the locking lug is in the locked position and the connected operational head is unlocked from the drive plate when the locking lug is in the unlocked position.

20 Claims, 9 Drawing Sheets

(56) References Cited

U.S. PATENT DOCUMENTS

| | | |
|---|---|---|
| 6,912,789 B2 | 7/2005 | Price |
| 6,983,543 B2 | 1/2006 | Fogle |
| 7,743,511 B2 | 6/2010 | Jerez |
| 7,913,401 B2 | 3/2011 | Iacona |
| 8,707,567 B2 * | 4/2014 | Proulx ............... A01D 34/4163 30/276 |
| 8,769,831 B2 | 7/2014 | Duvall |
| D756,728 S | 5/2016 | Alliss |
| 9,380,743 B2 | 7/2016 | Alliss |
| 9,603,301 B2 | 3/2017 | Jerez |
| 9,801,335 B2 | 10/2017 | Skinner |
| 9,861,033 B2 | 1/2018 | Skinner |
| 9,986,682 B2 | 6/2018 | Skinner |
| 2011/0119932 A1 | 5/2011 | Pfaltzgraff |
| 2015/0201557 A1 | 7/2015 | Jerez |
| 2015/0208575 A1 * | 7/2015 | Miller ................ A01D 34/001 56/12.7 |
| 2015/0245558 A1 | 9/2015 | Morabit |
| 2015/0342116 A1 | 12/2015 | Sprungman |
| 2015/0366131 A1 | 12/2015 | Skinner |
| 2016/0324067 A1 | 11/2016 | Skinner |
| 2017/0006775 A1 | 1/2017 | Wyne |
| 2018/0103582 A1 | 4/2018 | Self |
| 2018/0368315 A1 * | 12/2018 | Jones ....................... A01B 1/16 |
| 2019/0350131 A1 * | 11/2019 | Shin .................... A01D 34/4166 |
| 2020/0214202 A1 * | 7/2020 | Holman ............... A01D 34/736 |

FOREIGN PATENT DOCUMENTS

| | | |
|---|---|---|
| EP | 1358787 B1 | 2/2005 |
| EP | 3300573 A1 | 4/2018 |
| EP | 3536138 A1 | 9/2019 |
| JP | 4328365 B2 | 9/2009 |
| WO | WO2016209913 A1 | 12/2016 |

* cited by examiner

TRIMMER HEAD ASSEMBLY FOR A TRIMMER

This application claims the benefit of priority to U.S. Provisional Patent Application No. 62/704,044, filed on Jan. 3, 2019, the disclosure of which is incorporated by reference herein in its entirety.

FIELD

The present subject matter relates generally to trimmer devices, such as landscape trimmers, and more particularly to trimmer heads for such trimmers.

BACKGROUND

Landscape trimmers are typically useful for cutting grass or weeds, and may be used for edging around trees, fences, landscape borders, etc. Conventional landscape trimmers are often referred to as string trimmers and include an elongated shaft with a rotating head attached to one end of the elongated shaft. A spool or segment of monofilament string is often fixed to the rotating head in such embodiments. Thus, the monofilament string may rotate with the rotating head and act as a cutting element. Recently, trimmers having solid, non-string cutting elements (e.g., blades) attached to the rotating head have been utilized.

There can be various shortcomings for existing trimmers. For instance, when selecting or buying a trimmer, a user is often forced to decide whether string cutting elements or solid blades are preferred. If a user later wishes to use a different cutting element, that user must often purchase a completely new rotating head or landscape trimmer. Moreover, regardless of what type of cutting element is chosen, the cutting elements will eventually need to be replaced. This typically requires significant disassembly of the rotating head. For instance, at least a portion of the rotating head must be removed from the elongated shaft before cutting elements can be replaced and the rotating head is returned to the elongated shaft. These can all be cumbersome sources of frustration for users.

As a result, further improvements would be desirable in the field of landscape trimmers. In particular, it would useful for a rotating head to permit a user to selectively or alternately utilize a string or blade cutting element. Additionally or alternatively, it would be advantageous for the rotating head to include interchangeable elements which allow easy and efficient modification between different head designs and string/blade cutting configurations.

BRIEF DESCRIPTION

Aspects and advantages of the invention will be set forth in part in the following description, or may be obvious from the description, or may be learned through practice of the invention.

In accordance with one embodiment, a trimmer head for a trimmer is provided. The trimmer head includes a drive plate defining a lug slot, and a locking lug, the locking lug movably positioned in the lug slot and movable between an unlocked position and a locked position. The trimmer head further includes a drive plate cover connectable to the drive plate such that the locking lug is disposed between the drive plate and the drive plate cover. The trimmer head further includes at least one operational head, the at least one operational head connectable to the drive plate. The connected operational head is locked to the drive plate when the locking lug is in the locked position and the connected operational head is unlocked from the drive plate when the locking lug is in the unlocked position.

In accordance with another embodiment, a trimmer head for a trimmer is provided. The trimmer head includes a drive plate defining a lug slot, and a locking lug, the locking lug movably positioned in the lug slot and movable between an unlocked position and a locked position. The trimmer head further includes a drive plate cover connectable to the drive plate such that the locking lug is disposed between the drive plate and the drive plate cover, the drive plate cover defining a cam slot. The trimmer head further includes at least one operational head, the at least one operational head connectable to the drive plate, the operational head including a connection tab which defines a connection passage extending therethrough. Movement of the locking lug relative to the cam slot causes movement of the locking lug between the unlocked position and the locked position. The locking lug extends through the connection passage when the operational head is connected and the locking lug is in the locked position, and the locking lug is free from the connection passage when the operational head is connected and the locking lug is in the unlocked position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
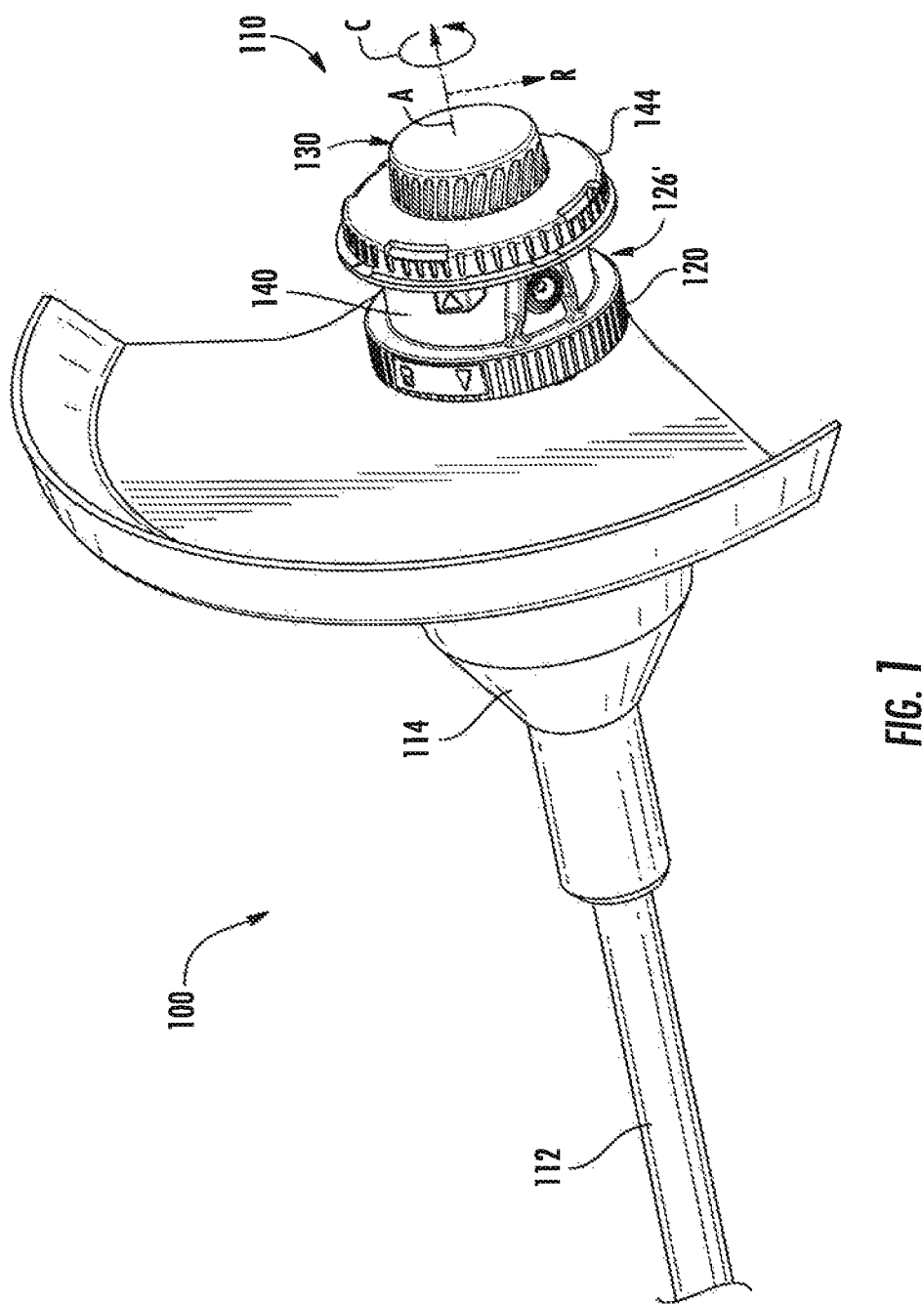
FIG. 1 provides a perspective view of a landscape trimmer in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Turning now to the figures, FIGS. 1 through 8 provide various views illustrating a trimmer head 110 for a landscape trimmer 100, according to exemplary embodiments of the present disclosure.

In certain embodiments, the landscape trimmer 100 is a hand-held powered landscape trimmer 100 that include an elongated shaft 112 for supporting a handle with a grip (not pictured), as generally shown in FIG. 1. However, these embodiments are merely provided for illustrative purposes, and are not intended to limit the present disclosure to any particular landscape trimmer. Thus, it is understood that in alternative embodiments, another suitable type of powered trimmer may be provided and, for example, may include a frame and wheels for movement over the ground.

Generally, the trimmer 100 includes an output shaft mechanically engaged with a motor 114 (e.g., a two-cycle gas engine, an electric motor, etc.) for driving rotation of the trimmer head 110. As shown, the trimmer head 110 defines an axial direction A, as well as radial direction R perpendicular to the axial direction A and a circumferential direction C about the axial direction A. A drive plate 122 may be couplable to and rotatable with an output shaft of the motor 114, such as via a central arbor 124 of the drive plate. As discussed in detail herein, a drive plate cover 120 may be connected to the drive plate 122 on one axial side thereof, and an operational head 126 may be connected to the drive plate 122 on an opposite axial side thereof. Rotation of the drive plate 122 may cause rotation of the trimmer head 110 generally during operation of the trimmer 100.

One or more flail blades or trimmer lines may be provided on or extend from the operational head 126 to rotate with the trimmer head 110 and act as a cutting agent (e.g., for grass, shrubs, vegetation, etc.).

The trimmer head 110 may include one or more operational heads 126, each of which may be easily and efficiently connected to and removed from the drive plate 122. In exemplary embodiments, the trimmer head 110 includes a plurality of operational heads 126. The operational heads 126 may be interchangeable, such that each individual operational head 126 may be connected to and removed from the drive plate 122 using the same general connection and removal methods and apparatus as discussed herein. However, each operational head 126 may be unique, and may include unique cutting features.

Figure 2:
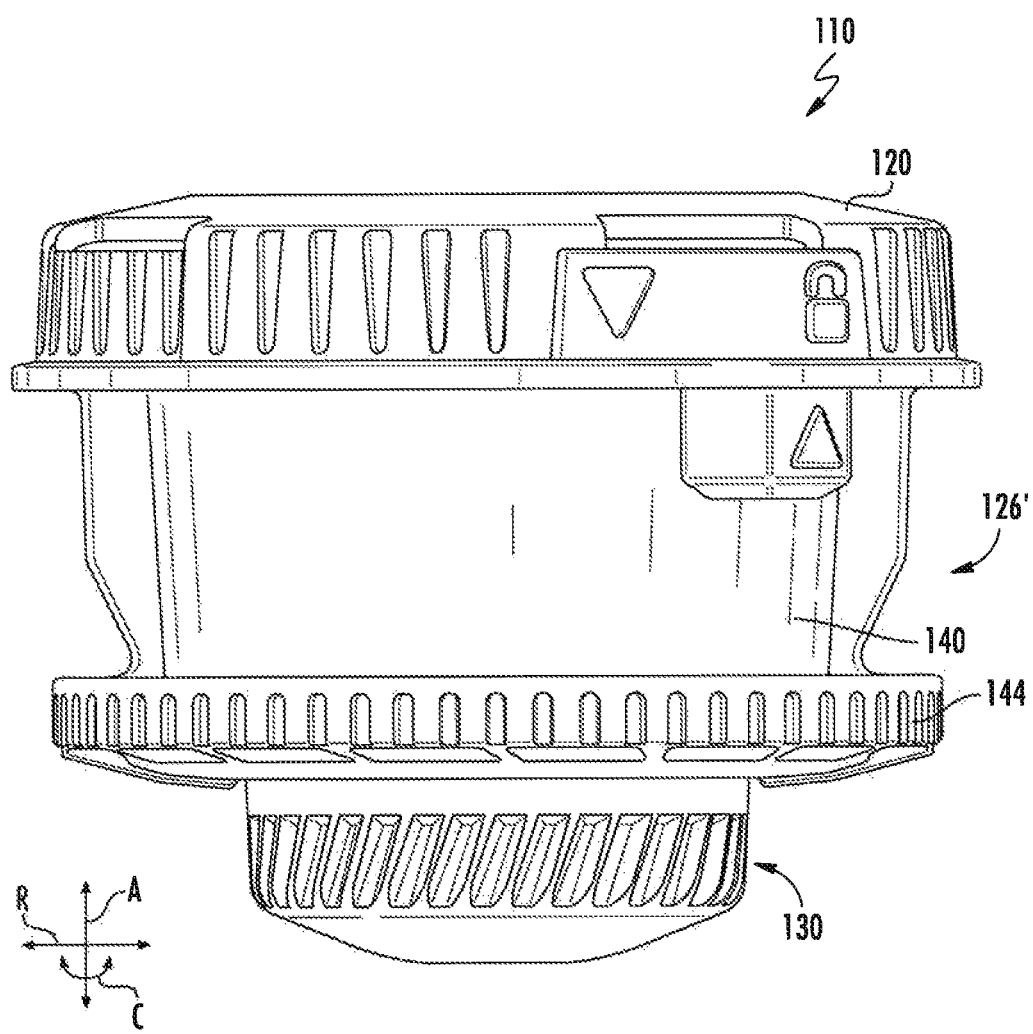
FIG. 2 is a side view of a trimmer head with a first interchangeable operational head in accordance with embodiments of the present disclosure.
Figure 3:
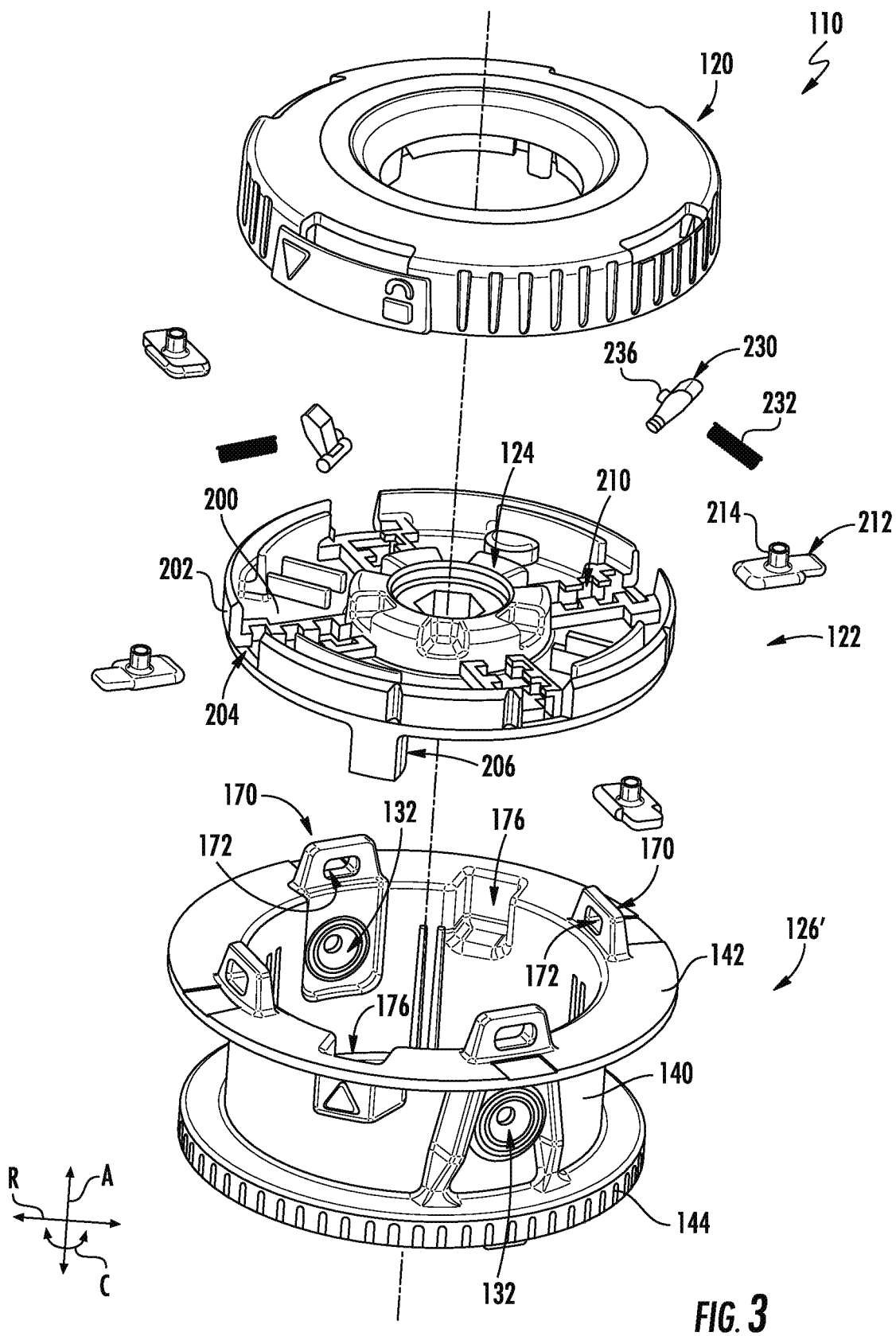
FIG. 3 is an exploded perspective view of the trimmer head of FIG. 2.
Figure 4:
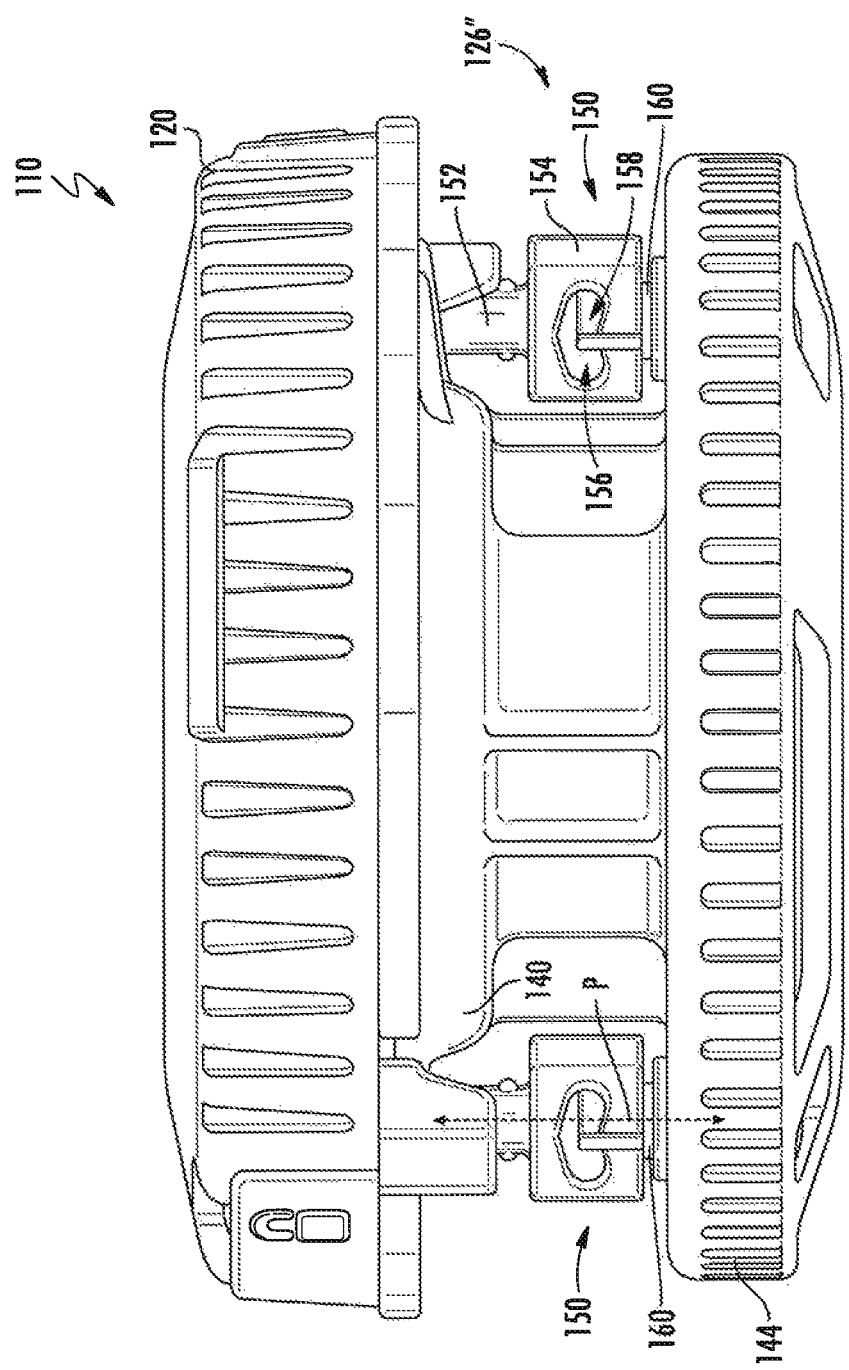
FIG. 4 is a side view of a trimmer head with a second interchangeable operational head in accordance with embodiments of the present disclosure.
Figure 5:
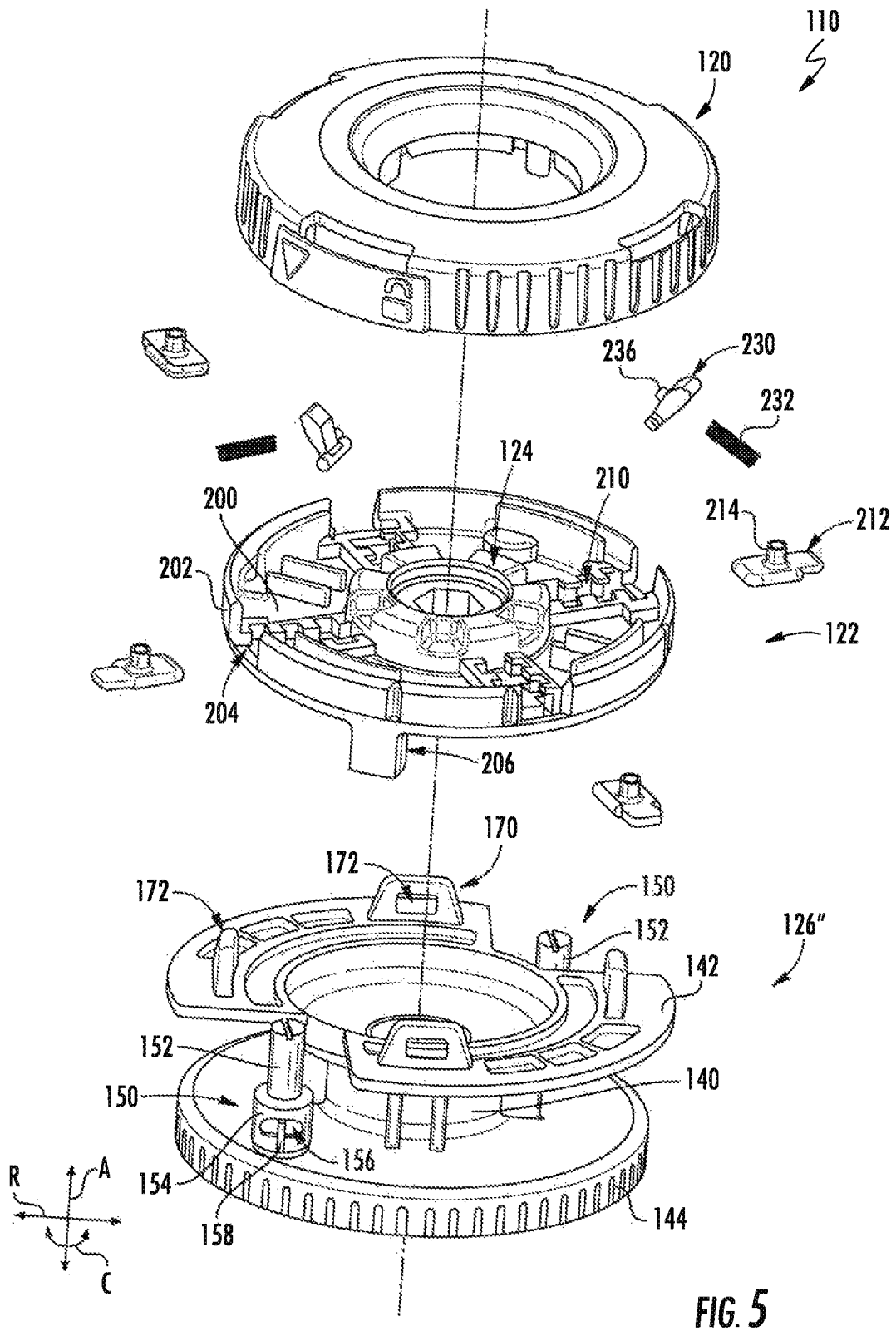
FIG. 5 is an exploded perspective view of the trimmer head of FIG. 4.

For example, FIGS. 2 and 3 illustrate a first operational head 126'. First operational head 126' in the embodiments shown is a "bump"-style head which includes a bump knob 130 and apertures 132 through which trimmer line may extend. FIGS. 4 and 5 illustrate a second operational head 126". Second operational head 126" in the embodiments shown is a "flail"-style head which can accommodate flail blades or trimmer line.

For example, first operational head 126' and/or second operational head 126" may include a central shaft 140, an upper flange 142 extending radially outward from the central shaft 140, and a lower flange 144 extending radially outward from the central shaft 140. The upper and lower flanges 142, 144 may be spaced apart along the axial direction A.

In the case of first operational head 126', bump knob 130 may extend from the lower flange 144. Apertures 132 may be defined in the central shaft 140.

In the case of second operational head 126", one or more pivot heads 150 may be attached (e.g., selectively attached) to the second operational head 126". When attached, the pivot heads 150 are rotationally fixed to the second operational head 126", such as to the lower flange 144 thereof, and may thus rotate with the second operational head 126". Further, in some embodiments, each pivot head 50 is generally permitted to pivot relative to the second operational head 126" about its own corresponding pivot axis P (e.g., parallel to the axial direction A). During operation of the trimmer 100, centrifugal force on the corresponding cutting agent (e.g., flail blade or trimmer line) may pivot the pivot head 150 so that the cutting agent extends outwardly (e.g., in the radial direction R or another suitable outward direction) during operation.

Each pivot head 150 includes a corresponding extended post 152 to hold or support a flail blade thereon. When assembled, the extended post 152 may be held above (e.g., spaced apart) from the lower flange 144 and extend axially (e.g., along the corresponding pivot axis P or parallel to the axial direction A). The corresponding flail blade may define an aperture through which the extended post 152 is permitted.

Each pivot head 150 may further include a main body 154 from which the extended post 152 is projected. For instance, the extended post 152 may project from the main body 154 to a free end at which no additional or enlarged features of the pivot head 150 are permanently affixed. When assembled, the main body 154 may rest on or be held above the lower flange 144. In turn, the main body 154 may be positioned between the extended post 152 and the lower flange 144 (e.g., along the corresponding pivot axis P or relative to the axial direction A).

The main body 154 defines a string slot 156 that can receive a string trimmer line therethrough. For instance, the string slot 156 may be defined as one or more openings through which two halves of a folded trimmer line may be inserted or received. In some embodiments, the string slot 156 is defined by an outer wall and an inner projection 158 cooperating to define a pair of line receptacles (in some embodiments as shown with an intermediate passage therebetween). The projection 158 separates the receptacles, and the intermediate passage connects the receptacles.

In additional or alternative embodiments, the pivot head 150 includes a head support 160 that is received (e.g., selectively received) within a complementary support void defined by and within the lower flange 144. As shown, the head support 160 extends (e.g., from the main body 154) in an opposite direction from the extended post 152. When assembled, the head support 160 may thus be positioned opposite from the extended post 152 (e.g., relative to the axial direction A).

In some embodiments, multiple pivot heads 150 are provided at discrete circumferential locations on the second operational head 126". Thus, each pivot head 150 may be circumferentially spaced about the axial direction A. In the illustrated embodiments, two pivot heads 150 are shown at two discrete circumferential locations on the second operational head 126". The two pivot heads 150 may be circumferentially spaced apart from each other more than 90° about the axial direction A (e.g., along the circumferential direction C). In specific embodiments, the pivot heads 150 are spaced 180° apart from each other along the circumferential direction C. However, it is understood that alternative embodiments may include any suitable number or arrangement of pivot heads 150 on the second operational head 126" in one or more circumferential locations. In some embodiments, the pivot heads 150 are equally spaced apart from each other, although alternatively the pivot head 150 spacing may be unequal.

Referring now generally to FIGS. 2 through 11, an operational head 126' (which may be either of first operational head 126' or second operational head 126") may be connected to the drive plate 122. The present disclosure is further directed to particularly advantageous features of the trimmer head 110 which facilitate easy and efficient connection of and removal of an operational head 126'. Such features advantageously allow a user to selectively or alternatively utilize trimmer line or flail blades are desired or required, and further advantageously allow a user to quickly change out elements of the trimmer head 110 to change between different head designs and string/blade cutting configurations. In some embodiments, such advantageous are provided by features which facilitate ease of connecting, locking, and unlocking of the operational head 126 to the drive plate 122 and drive plate cover 120. Movement in a first direction of an operational head 126, e.g. rotational movement about the axial direction A, that is connected to the drive plate 122 may cause locking of the operational head 126 to the drive plate 122, and movement in a second opposite direction of the operational head 126, e.g. rotational movement about the axial direction A, that is connected to the drive plate 122 may cause unlocking of the operational head 126 to the drive plate 122.

As shown, each operational head 126 may include one or more connection tabs 170. Each connection tab 170 may extend from the main body of the operational head 126, such as along the axial direction A. A connection passage 172 may be defined in each connection tab 170. As discussed herein, the connection tabs 170 and passages 172 thereof may be utilized to lock the operational head 126 in secured connection to the drive plate 122.

The connection tabs 170 may be disposed in an annular array, e.g. along the circumferential direction C. In some embodiments as shown, four connection tabs 170 may be utilized, although in alternative embodiments two, three, five, or more connection tabs 170 may be utilized. In some embodiments, the connection tabs 170 are equally spaced apart from each other, although alternatively the connection tab 170 spacing may be unequal.

In some embodiments, such as in the case of first operational head 126', the operational head 126 may further define one or more connection pockets 176. Such pockets 176 may, for example, be defined in the upper flange 142 and/or central shaft 140. The connection pockets 176 may be disposed in an annular array, e.g. along the circumferential direction C. In some embodiments as shown, two connection pockets 176 may be utilized, although in alternative embodiments three, four, five, or more connection pockets 176 may be utilized. In some embodiments, the connection pockets 176 are equally spaced apart from each other, although alternatively the connection pocket 176 spacing may be unequal.

As shown, the drive plate 122 may include a plate body 200. Body 200 may have a generally cylindrical shape. A peripheral wall 202 may extend from an outer periphery of the plate body 200, such as along the axial direction A. One or more peripheral openings 204 may be defined in the peripheral wall 202 and body 200.

One or more connection legs 206 may extend from the plate body 200, such as along the axial direction A in a direction opposite the peripheral wall 202. In some embodiments, a void 208 may be defined in each connection leg 206. The connection legs 206 may facilitate the connection of the drive plate 122 to an operational head 126. For example, to connect a first operational head 126' to the drive plate 122, each connection leg 206 may be inserted into a corresponding connection pocket 176. To connect a second operational head 126" to the drive plate 122, an extended post 152 of a pivot head 150 may be inserted into a corresponding void 208 of a connection leg 206.

Regardless of the type of operational head 126 being utilized, the operational head 126 may be connected to the drive plate 122. Such connection may occur when the operational head 126 is placed into contact with the drive plate 122 such that each connection tab 170 extends through a corresponding peripheral opening 204.

The connection between the drive plate 122 and operational head 126 must further be secured via locking of these components together. During removal, the components may be unlocked. Locking and unlocking of the components may be easy and efficient as described herein. Notably, in general, locking and unlocking of the components may be accomplished via movement of the connected operational head 126, and thus the drive plate 122, relative to the drive plate cover 120. Such movement may, for example, be rotational movement along the circumferential direction C and about the axial direction A.

The drive plate 122, such as the body 200 thereof, may define one or more lug slots 210. A locking lug 212 may be movably positioned in each lug slot 210. In some embodiments as shown, four lug slots 210 may be utilized, although in alternative embodiments two, three, five, or more lug slots 210 may be utilized. In some embodiments, the lug slots 210 are equally spaced apart from each other, although alternatively the lug slots 210 spacing may be unequal. In exemplary embodiments, the lug slots 210 may each extend along the radial direction R.

Figure 6:
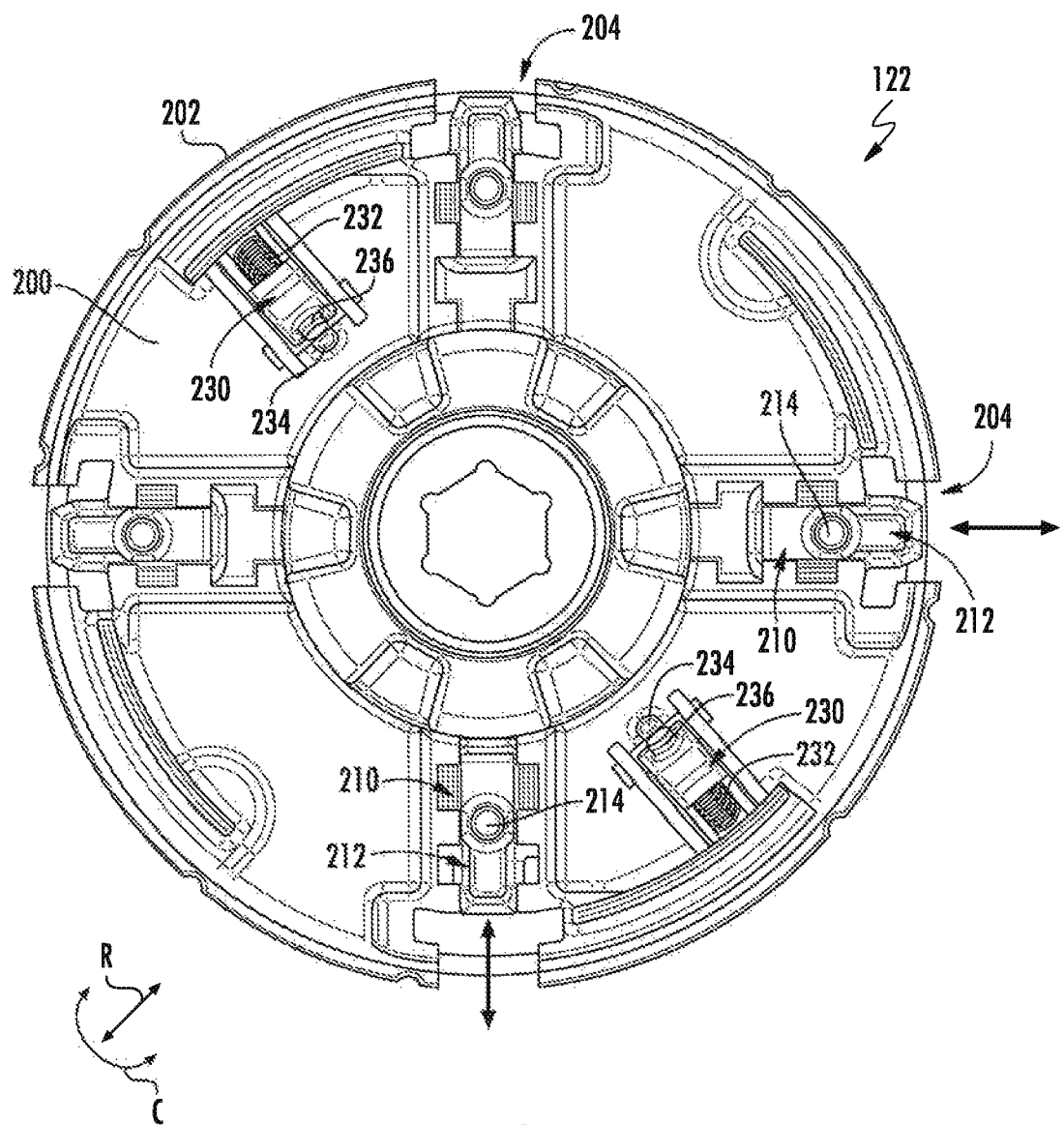
FIG. 6 is a top view of a drive plate of a trimmer head in accordance with embodiments of the present disclosure.

Each locking lug 212 may be movably positioned in a lug slot 210, and thus movable within the lug slot 210, such as in exemplary embodiments along the radial direction R. Such movement may be between a locked position and an unlocked position. In FIG. 6, three locking lugs 212 are shown in the locked position, while a single locking lug 212 (at the "6 o'clock" position) is shown in the unlocked position for illustrative purposes only. When an operational head 126 is connected to the drive plate 122, each connection tab 170 extends through a corresponding peripheral opening 204, as discussed. When the locking lugs 212 are moved to the locked positions, the lugs 212 may extend into the corresponding peripheral openings 204 and through the connection passages 172 defined in the connection tabs 170, thus locking the operational head 126 to the drive plate 122. When the locking lugs 212 are moved to the unlocked positions, the lugs 212 may be removed and free from the connection passages 172 defined in the connection tabs 170, thus unlocking the operational head 126 from the drive plate 122. Accordingly, a connected operational head 126 is locked to the drive plate 122 when the locking lugs 212 are in the locked positions, and a connected operational head 126 is unlocked from the drive plate 122 when the locking lugs 212 are in the unlocked positions.

In some embodiments, the movement of the locking lugs 212 may be caused by interaction between the drive plate 122 and drive plate cover 120. As shown, the drive plate cover 120 is connectable to the drive plate 122. When connected, the locking lugs 212 and lug slots 210 may be disposed between the drive plate cover 120 and the drive plate 122.

Figure 10:
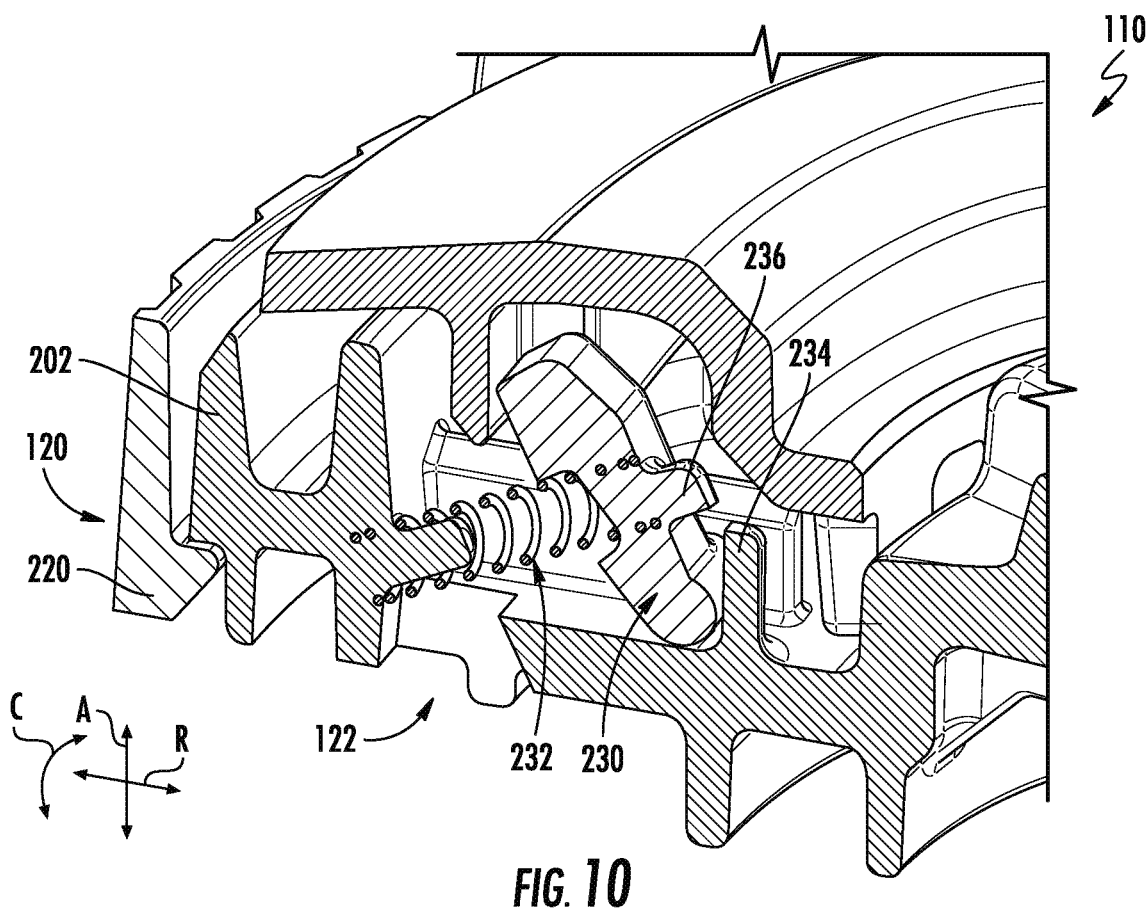
FIG. 10 is a sectional view illustrating a connection of a drive plate and drive plate cover in accordance with embodiments of the present disclosure.

As shown in FIG. 10, the drive plate cover 120 may include an inner lip 220. Drive plate cover 120 may be brought into contact with the drive plate 122 such that the inner lip 220 contacts a periphery of the drive plate 122, e.g. on a side of the body 200 opposite the peripheral wall 202. Such interaction may connect the drive plate cover 120 and drive plate 122.

Figure 7:
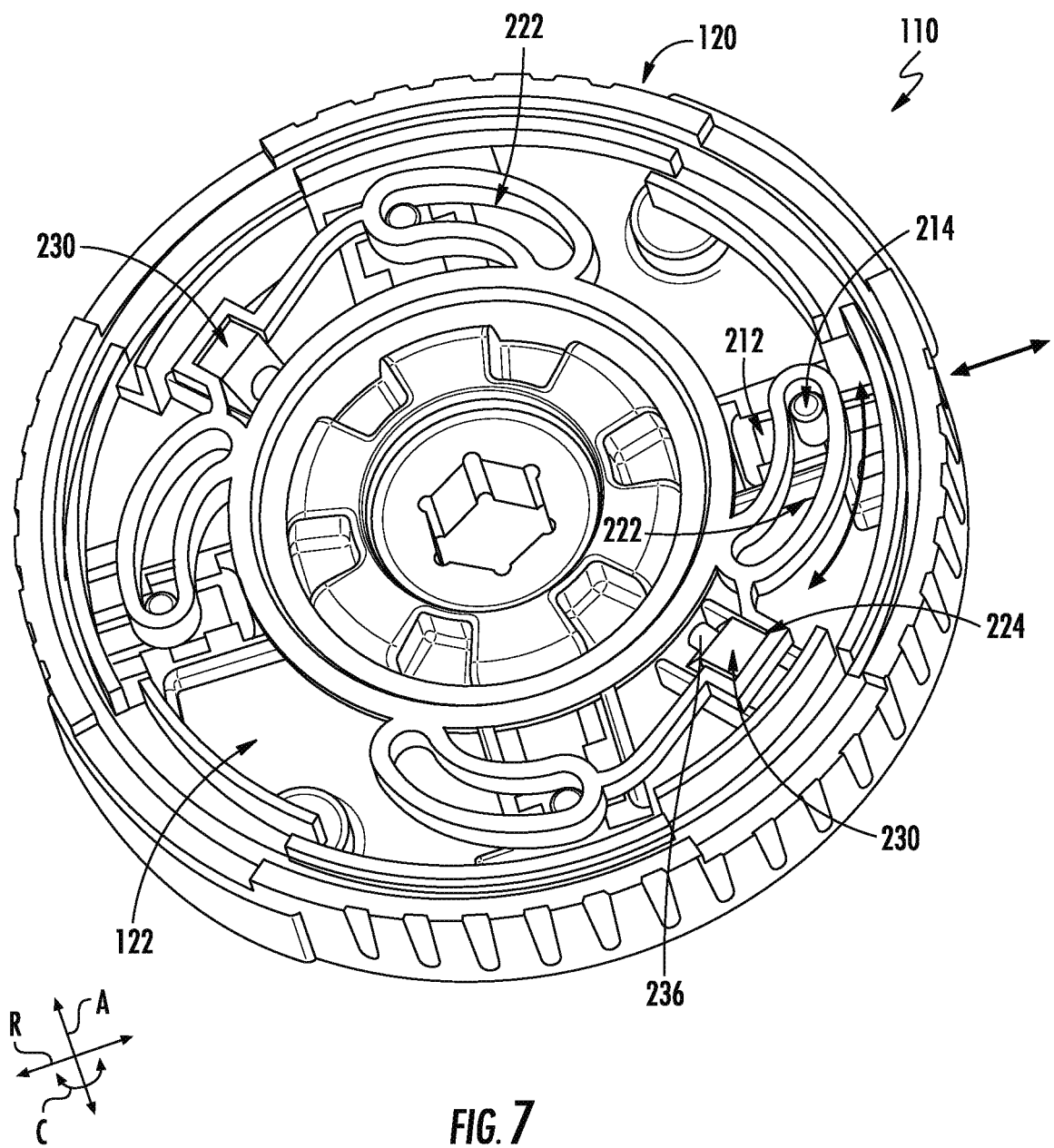
FIG. 7 is a top perspective view of a drive plate and drive plate cover (with the drive plate cover shown in section such that inner components of the drive plate cover are visible for illustrative purposes) in accordance with embodiments of the present disclosure.

In some embodiments, as shown in FIG. 7, the drive plate cover 120 may define one or more cam slots 222. Each cam slot 222 may correspond with one of the one or more locking lugs 212. Movement of the locking lugs 212 relative to the corresponding cam slots 222 may cause movement of the locking lugs 212 between the unlocked positions and locked positions as discussed herein. For example, each cam slot 222 may have a generally arcuate shape. Each slot may further extend radially outward as it extends along the circumferential direction C. Each locking lug 212 may be movably coupled to a corresponding cam slot 222, such that movement of the locking lug 212 in the circumferential direction C (e.g. rotational movement) causes movement between the locked and unlocked positions (e.g. radial movement).

In some embodiments, as shown, a post 214 extends from each locking lug 212, such as along the axial direction A, and the post 214 movably couples the locking lug 212 to the cam slot 222 by being positioned in the cam slot 222 when the drive plate cover 120 is connected to the drive plate 122. Rotational movement of the locking lug 212 thus causes movements of the post 214 relative to the cam slot 222, which in turn causes radial movement of the locking lug 212 as the post 214 rides within the cam slot 222.

In some embodiments, movement of the locking lugs 212 relative to the corresponding cam slots 222 is caused by movement, which may be rotational movement about the axial direction A, of the connected operational head 126 relative to the drive plate cover 120. For example, the operational head 126 may be rotated, and such rotation may further cause rotation of the drive plate 122 due to the connection of the operational head 126 and drive plate 122. Accordingly, such rotation may cause rotational movement of the locking lugs 212 relative to the drive plate cover 120 and the cam slots 222 thereof. Accordingly, movement of the connected operational head 126 relative to the drive plate cover 120 may cause locking and unlocking of the head 110, e.g. due to movement of the locking lugs 212 between the locked and unlocked positions. Notably, movement in a first direction, e.g. rotational movement in a first direction, of the connected operational head 126 may cause locking, while movement in a second opposite direction, e.g. rotational movement in a second opposite direction, may cause unlocking.

Referring again generally to FIGS. 2 through 11, additional features may be provided in trimmer head 110 to further secure the trimmer head 110 in a locked configuration during use in a trimmer 100. For example, one or more centrifugal locks 230 may be provided, each centrifugal lock 230 positioned in the drive plate 122. In some embodiments as shown, two centrifugal locks 230 may be utilized, although in alternative embodiments three, four, five or more centrifugal locks 230 may be utilized. In some embodiments, the centrifugal locks 230 are equally spaced apart from each other, although alternatively the centrifugal locks 230 spacing may be unequal.

Figure 8:
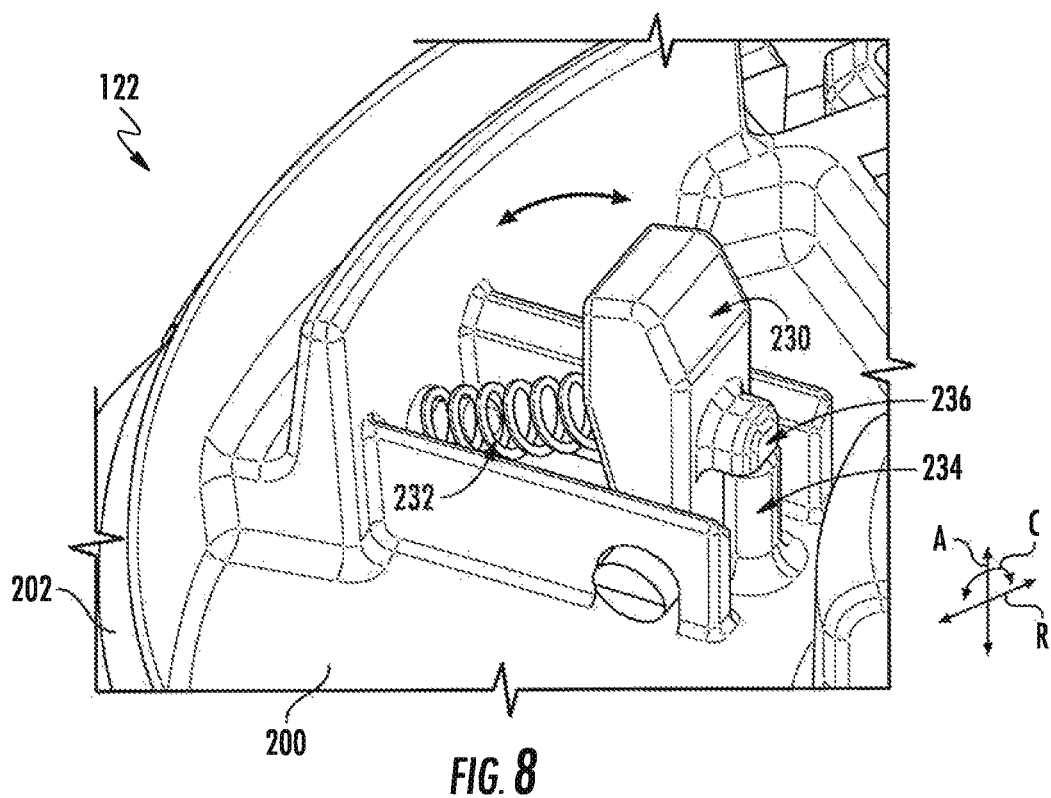
FIG. 8 is a top perspective view of a centrifugal lock in an unlocked position in accordance with embodiments of the present disclosure.
Figure 9:
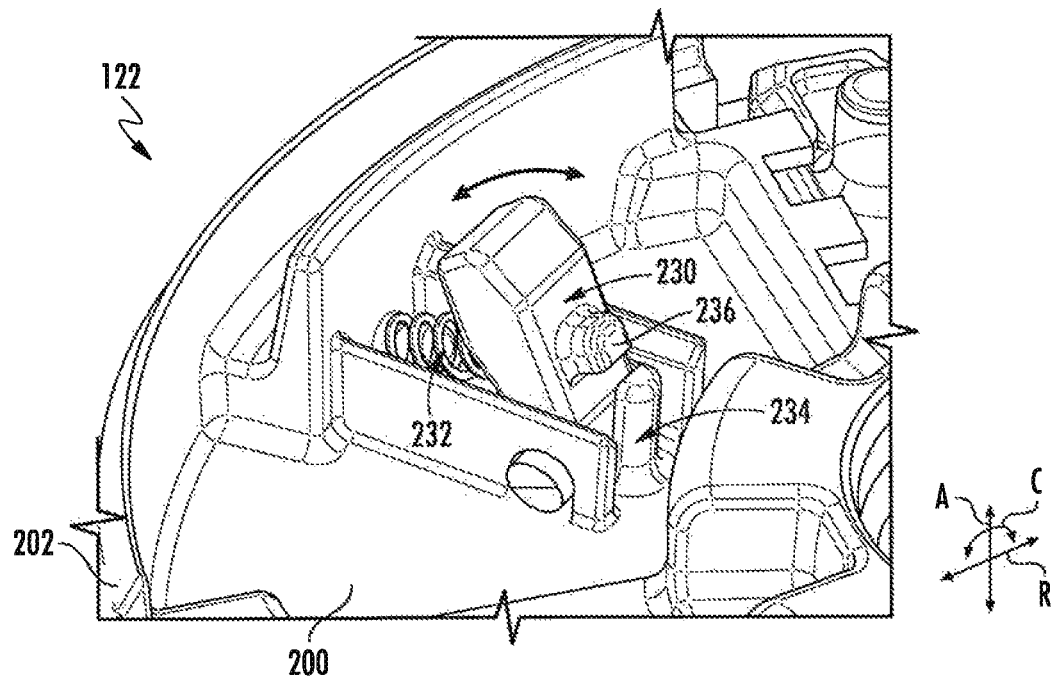
FIG. 9 is a top perspective view of a centrifugal lock in a locked position in accordance with embodiments of the present disclosure.

Each centrifugal lock 230 may be movable between an unlocked position and a locked position, as discussed herein. In some embodiments, such movement may be pivotal movement, as shown. For example, FIGS. 6 and 8 illustrate centrifugal locks 230 in unlocked positions, while FIGS. 7, 9, and 10 illustrate centrifugal locks 230 in locked positions. Further, in some embodiments, each centrifugal lock 230 may be biased towards the unlocked position. For example, in some embodiments, a spring 232 extending and in contact between a lock 230 and the drive plate 122 may impart a spring force onto the lock 230 to bias the lock into the unlocked position. Such spring 232 may be a compression spring which imparts such force when the lock 230 is moved towards the locked position. Additionally or alternatively, a protrusion 234 be provided in the drive plate 122, e.g. extending from the plate body 200 such as along the axial direction A. The protrusion 234 may be positioned to contact the centrifugal lock 230, such a protrusion 236 thereof, when the lock 230 is in the unlocked position. The protrusion 234 thus acts as a stop to prevent over-movement, e.g. over-pivoting of the lock 230.

Centrifugal forces imparted on the trimmer head 110 during rotation thereof as the trimmer 100 is operated may cause movement of the centrifugal locks 230 between the unlocked and locked positions, such as towards the locked positions. Further, as illustrated in FIG. 7, one or more lock notches 224 may be defined in the drive plate cover 120. Each lock notch 224 may correspond with a centrifugal lock 230, such that the centrifugal lock 230 can move, e.g. pivot, into the lock notch 224. A centrifugal lock 230 may thus be disposed in the corresponding lock notch 224 when in the locked position, and may be free from the corresponding lock notch 224 when in the unlocked position. Accordingly, additional security of the trimmer head 110 may be provided during operation thereof via locking of the centrifugal locks 230.

Figure 11:
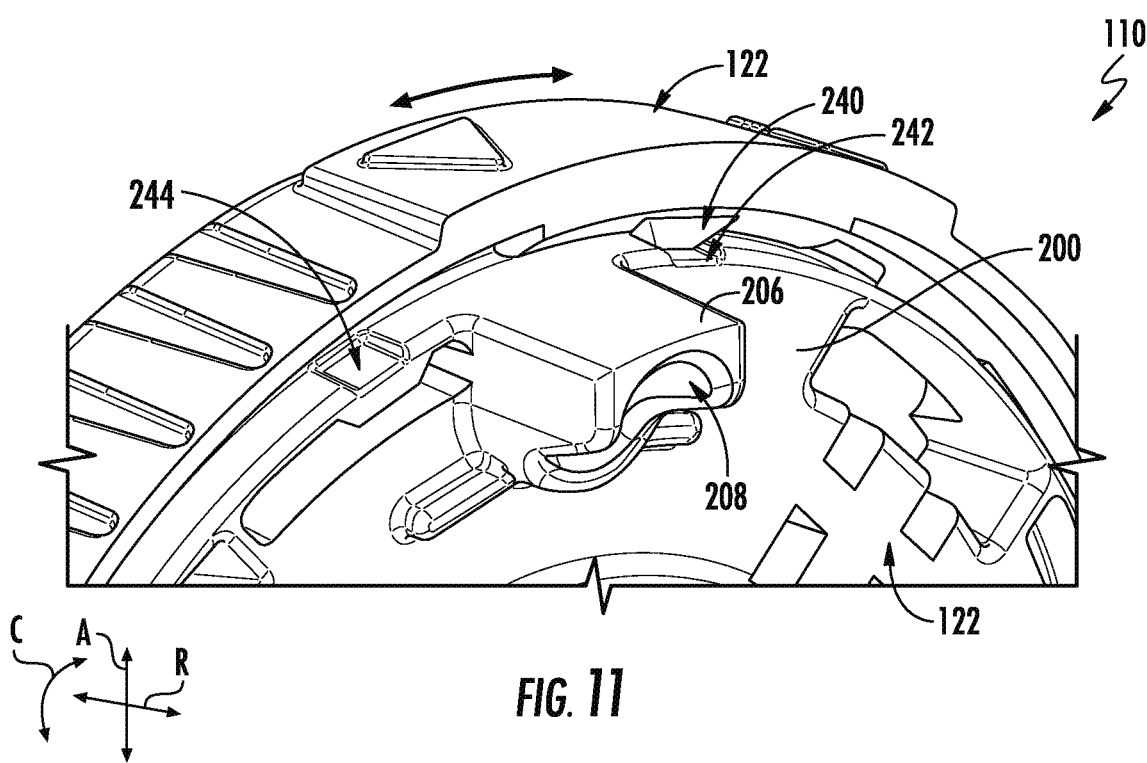
FIG. 11 is a bottom perspective view of a connected drive plate and drive plate cover in accordance with embodiments of the present disclosure.

As illustrated in FIG. 11, one or more detents 240 may be provided, along with one or more sets of first detent notches 242 and second detent notches 244 (with a set including one first detent notch 242 and one second detent notch 244). In some embodiments as shown, the detents 240 may be included in the drive plate cover 120, such as extending internally therefrom (e.g. in a radial direction R), and the first and second detent notches 242, 244 may be defined in the drive plate 122, such as in an outer periphery of the plate body 200. Alternatively, the detents 240 may be included in the drive plate 122 and the notches 242, 244 defined in the drive plate cover 120. The detent 240 may be selectively seated in the corresponding first detent notch 242 or second detent notch 244 when the drive plate cover 120 is connected to the drive plate 122. For example, when the operational head 126 is connected in an unlocked position relative to the drive plate cover 120, the detent 240 may be disposed in one of the first detent notch 242 or second detent notch 244. When the operational head 126 is connected in a locked position relative to the drive plate cover 120, the detent 240 may be disposed in the other of the first detent notch 242 or second detent notch 244. Accordingly, additional security of the trimmer head 110 is provided, in particular at zero speed or during use at low speeds when centrifugal forces are not sufficiently strong to cause movement of the locks 230 into the locked positions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A trimmer head for a trimmer, the trimmer head comprising:
    a drive plate defining a lug slot;
    a locking lug, the locking lug movably positioned in the lug slot and movable along a radial direction between an unlocked position and a locked position;
    a drive plate cover connectable to the drive plate such that the locking lug is disposed between the drive plate and the drive plate cover; and
    at least one operational head, the at least one operational head connectable to the drive plate,
    wherein the connected operational head is locked to the drive plate when the locking lug is in the locked position and the connected operational head is unlocked from the drive plate when the locking lug is in the unlocked position.

2. The trimmer head of claim 1, wherein the operational head comprises a connection tab which defines a connection passage extending therethrough, wherein the locking lug extends through the connection passage when the operational head is connected and the locking lug is in the locked position, and wherein the locking lug is free from the connection passage when the operational head is connected and the locking lug is in the unlocked position.

3. The trimmer head of claim 1, wherein the drive plate cover defines a cam slot, and wherein movement of the locking lug relative to the cam slot causes movement of the locking lug between the unlocked position and the locked position.

4. The trimmer head of claim 3, wherein a post extends from the locking lug, the post positioned in the cam slot when the drive plate cover is connected to the drive plate.

5. The trimmer head of claim 3, wherein the movement of the locking lug relative to the cam slot is caused by movement of the connected operational head relative to the drive plate cover.

6. The trimmer head of claim 5, wherein the movement of the connected operational head relative to the drive plate cover is rotational movement.

7. The trimmer head of claim 1, wherein the drive plate cover further defines a lock notch, and further comprising a centrifugal lock movable between an unlocked position and a locked position, wherein the centrifugal lock is disposed in the lock notch when in the locked position and is outside of the lock notch when in the unlocked position.

8. The trimmer head of claim 7, wherein the centrifugal lock is pivotable between the unlocked position and the locked position.

9. The trimmer head of claim 7, wherein the centrifugal lock is biased towards the unlocked position.

10. The trimmer head of claim 1, wherein the drive plate cover further comprises a detent and the drive plate defines a first detent notch and a second detent notch, wherein the detent is selectively seated in the first detent notch or the second detent notch when the drive plate cover is connected to the drive plate.

11. The trimmer head of claim 1, wherein the trimmer head is a trimmer head kit and the at least one operational head is a plurality of interchangeable operational heads.

12. A trimmer head for a trimmer, the trimmer head comprising:
    a drive plate defining a lug slot;
    a locking lug, the locking lug movably positioned in the lug slot and movable between an unlocked position and a locked position;
    a drive plate cover connectable to the drive plate such that the locking lug is disposed between the drive plate and the drive plate cover, the drive plate cover defining a cam slot; and
    at least one operational head, the at least one operational head connectable to the drive plate, the operational head comprising a connection tab which defines a connection passage extending therethrough,
    wherein movement of the locking lug relative to the cam slot causes movement of the locking lug between the unlocked position and the locked position, and
    wherein the locking lug extends through the connection passage when the operational head is connected and the locking lug is in the locked position, and the locking lug is free from the connection passage when the operational head is connected and the locking lug is in the unlocked position.

13. The trimmer head of claim 12, wherein a post extends from the locking lug, the post positioned in the cam slot when the drive plate cover is connected to the drive plate.

14. The trimmer head of claim 12, wherein the movement of the locking lug relative to the cam slot is caused by movement of the connected operational head relative to the drive plate cover.

15. The trimmer head of claim 12, wherein the drive plate cover further defines a lock notch, and further comprising a centrifugal lock movable between an unlocked position and a locked position, wherein the centrifugal lock is disposed in the lock notch when in the locked position and is outside of the lock notch when in the unlocked position.

16. The trimmer head of claim 15, wherein the centrifugal lock is pivotable between the unlocked position and the locked position.

17. The trimmer head of claim 15, wherein the centrifugal lock is biased towards the unlocked position.

18. The trimmer head of claim 12, wherein the drive plate cover further comprises a detent and the drive plate defines a first detent notch and a second detent notch, wherein the detent is selectively seated in the first detent notch or the second detent notch when the drive plate cover is connected to the drive plate.

19. The trimmer head of claim 12, wherein the trimmer head is a trimmer head kit and the at least one operational head is a plurality of interchangeable operational heads.

20. A trimmer head for a trimmer, the trimmer head comprising:
- a drive plate defining a lug slot;
- a locking lug, the locking lug movably positioned in the lug slot and movable between an unlocked position and a locked position;
- a drive plate cover connectable to the drive plate such that the locking lug is disposed between the drive plate and the drive plate cover; and
- at least one operational head, the at least one operational head connectable to the drive plate,
- wherein the connected operational head is locked to the drive plate when the locking lug is in the locked position and the connected operational head is unlocked from the drive plate when the locking lug is in the unlocked position, and
- wherein the drive plate cover further defines a lock notch, and further comprising a centrifugal lock movable between an unlocked position and a locked position, wherein the centrifugal lock is disposed in the lock notch when in the locked position and is outside of the lock notch when in the unlocked position.

* * * * *